R. M. McGAHEE.
VEHICLE SPRING.
APPLICATION FILED DEC. 30, 1910.
999,826.
Patented Aug. 8, 1911.
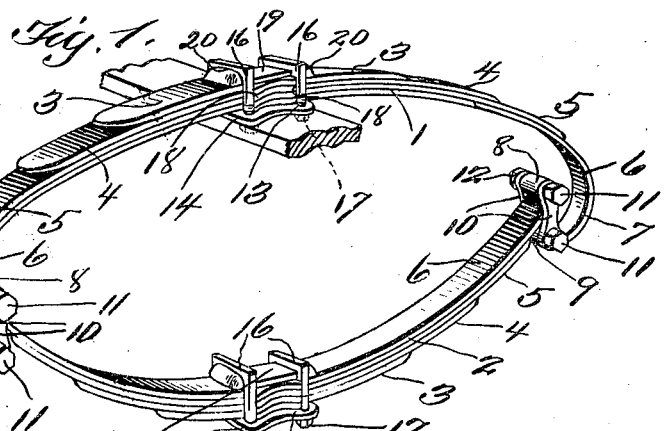

UNITED STATES PATENT OFFICE.

RANDOLPH M. McGAHEE, OF TAMPA, FLORIDA.

VEHICLE-SPRING.

999,826. Specification of Letters Patent. Patented Aug. 8, 1911.

Application filed December 30, 1910. Serial No. 600,039.

*To all whom it may concern:*

Be it known that I, RANDOLPH M. Mc-GAHEE, a citizen of the United States, residing at Tampa, in the county of Hillsboro and State of Florida, have invented a new and useful Vehicle-Spring; and I do hereby declare the following to be a full, clear, and exact description of the invention, such as will enable others skilled in the art to which it appertains to make and use the same.

This invention relates to the art of vehicles, such as carriages, wagons, automobiles and the like, and it more especially pertains to a new and useful elliptical spring.

The object of the invention is to provide a novel form of means for clamping the several leaves of the upper and lower parts of the elliptical spring together.

A further feature of the invention is to provide the several leaves with oppositely arranged shoulders to coöperate with the clamping means to prevent movement of the clamping means in one direction, and a shouldered plate to prevent movement of the clamping means in the opposite direction.

The invention comprises further features and combination of parts, to be hereinafter more fully set forth, shown in the drawings and claimed.

In the drawings:—Figure 1 is a perspective view of an elliptical spring embodying the features of the invention. Fig. 2 is a sectional view through the spring. Fig. 3 is a sectional view on line 3—3 of Fig. 2. Fig. 4 is a perspective view in detail of several of the leaves of the spring, and the plate with its shoulders, and illustrating the shoulders of the leaves. Fig. 5 is a detail perspective view of the clamping means for the leaves of the spring.

As to the annexed drawings, 1 and 2 designate the upper and lower parts of the spring, which are composed of the several leaves 3, 4, 5 and 6. The leaf 6 of the upper part of the spring curves downwardly and slightly under the ends of the lower part, at each end of the spring, as shown at 7, while the leaf 6 of the lower part of the spring is without these curved end portions. However, the ends of the leaf 6 of the lower part terminate in rolls 8, while the downwardly curved ends of the leaf 6 of the upper part is provided with similar rolls 9. Links 10 are connected to the rolls by means of the bolts 11. It will be observed that the bolts penetrate the links and pass through the rolls, and upon their ends nuts 12 are threaded. It will be apparent that as pressure is applied upon the upper part of the spring, the downwardly curved ends will move outwardly and downwardly, which will move the outer ends of the lower part of the spring likewise, by virtue of the link connections. The leaves 6 of both parts of the spring are longer than the remaining leaves, and the leaves above and below the leaves 6 diminish in length, thus affording an increased yielding action at the central portion of the upper and lower parts of the spring.

To hold the various leaves of the upper and lower parts in their relative positions, clamping means 13 are provided. These clamping means embody the plates 14 and 15. The plate 15 is disposed below the leaf 3 of the lower part, while the plate 14 is disposed below the leaf 6 of the upper part, and penetrating the plates are the staple members 16 (which arch over the several leaves of the upper and lower parts of the spring to hold the leaves in place), and to the threaded ends of the staples nuts 17 are applied. By virtue of the staples, the plates, and the nuts the several leaves of the upper and lower parts of the spring are clamped securely together. To prevent displacement of the staples the several leaves of the upper and lower parts of the spring are provided with oppositely arranged laterally extending shoulders 18. These shoulders 18 contact with the staples, and prevent displacement in one direction, while the plates 19 including the shoulders 20 prevent movement of the staples in the opposite direction. The shoulders 20 of the plates 19 combined with the shoulders of the leaves prevent movement of the entire clamping means. It will be observed that the various leaves of the springs are without holes or apertures for securing the spring to vehicles. However, the spring may be secured in position upon a vehicle by any suitable method, for instance as shown in the drawings.

From the foregoing it will be observed that there has been provided a novel form of elliptical spring, including strength and durability, and furthermore one that will fulfil the various requirements.

The invention having been set forth, what is claimed as new and useful is:—

In an elliptical spring, the combination of several leaves provided upon their even edges with lug shoulders, the contact faces of which face outwardly toward the ends of the leaves, a plate disposed adjacent the uppermost leaf and having shoulders at each end, the contact faces of which face one another and are disposed in positions beyond the first contact faces, staples arching down over the leaves with their side portions in contact with the first contact faces while their upper portions are in contact with the second contact faces, a second plate disposed below the lowermost leaf and through which the threaded ends of the staples extend, and nuts fixed to the threaded ends of the staples for holding the structure together.

In testimony whereof I have signed my name to this specification in the presence of two subscribing witnesses.

RANDOLPH M. McGAHEE.

Witnesses:
S. V. RAY,
W. H. JACKSON.

Copies of this patent may be obtained for five cents each, by addressing the "Commissioner of Patents, Washington, D. C."